United States Patent
Thakore et al.

(10) Patent No.: US 12,519,857 B2
(45) Date of Patent: *Jan. 6, 2026

(54) PRIORITIZED TAG BASED VIRTUAL PRIVATE NETWORK CONNECTION

(71) Applicant: Netskope, Inc., Santa Clara, CA (US)

(72) Inventors: Parag Pritam Thakore, Los Gatos, CA (US); Sunil Mukundan, Chennai (IN); Anupam Rai, Fremont, CA (US)

(73) Assignee: Netskope, Inc., Santa Clara, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/642,616

(22) Filed: Apr. 22, 2024

(65) Prior Publication Data
US 2024/0348691 A1    Oct. 17, 2024

Related U.S. Application Data

(63) Continuation of application No. 18/186,019, filed on Mar. 17, 2023, now Pat. No. 11,968,269.

(51) Int. Cl.
| | | |
|---|---|---|
| *H04L 67/141* | (2022.01) | |
| *H04L 12/46* | (2006.01) | |
| *H04L 45/02* | (2022.01) | |

(52) U.S. Cl.
CPC ........ *H04L 67/141* (2013.01); *H04L 12/4645* (2013.01); *H04L 45/04* (2013.01)

(58) Field of Classification Search
CPC .... H04L 67/141; H04L 12/4645; H04L 45/04
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |
| (Continued) | | |

FOREIGN PATENT DOCUMENTS

| | | |
|---|---|---|
| CA | 2653862 A1 | 8/2009 |
| CN | 117795926 A | 3/2024 |
| (Continued) | | |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Ayman A Abaza
*Assistant Examiner* — Hooman Houshmand
(74) *Attorney, Agent, or Firm* — MUGHAL GAUDRY & FRANKLIN PC

(57) ABSTRACT

A multi-tenant cloud native system for providing network connections between a plurality of gateway endpoints using prioritized tags and secure tunnels. An end-user device includes a client endpoint for sending a request to a cloud control plane for establishing a network connection with a service endpoint of the gateway endpoint. Tags are assigned to the gateway endpoints in the network and are classified into one or more categories based on tag policies. One or more tags are prioritized for network connection in a prioritizing order. Connectivity of the tags and tunnels between the gateway endpoint are identified from network traffic of devices corresponding to the gateway endpoints. A database of devices with device addresses is identified to determine routes between the gateway endpoints. A secure tunnel is determined from the tunnels based on the tags and the (Continued)

network connection is established via the secure tunnel using the routes.

20 Claims, 10 Drawing Sheets

(56) References Cited

U.S. PATENT DOCUMENTS

| | | |
|---|---|---|
| 6,622,248 B1 | 9/2003 | Hirai |
| 6,680,922 B1 | 1/2004 | Jorgensen |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,424,089 B2 | 4/2013 | Jung et al. |
| 8,793,151 B2 | 7/2014 | DelZoppo et al. |
| 8,839,417 B1 | 9/2014 | Jordan |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,294,507 B1 | 3/2016 | Roth et al. |
| 9,614,737 B1 * | 4/2017 | Brandwine ............ H04L 63/08 |
| 9,811,662 B2 | 11/2017 | Sharpe et al. |
| 9,912,582 B2 * | 3/2018 | Pourzandi ............ H04L 41/042 |
| 10,084,642 B2 | 9/2018 | Goldfarb et al. |
| 10,084,825 B1 | 9/2018 | Xu |
| 10,117,124 B2 | 10/2018 | Basilier et al. |
| 10,142,243 B2 | 11/2018 | Dhanabalan |
| 10,237,282 B2 | 3/2019 | Nelson et al. |
| 10,305,757 B2 * | 5/2019 | Yadav ..................... H04L 67/75 |
| 10,334,442 B2 | 6/2019 | Vaughn et al. |
| 10,382,468 B2 | 8/2019 | Dods |
| 10,484,334 B1 | 11/2019 | Lee et al. |
| 10,657,093 B2 | 5/2020 | Chan et al. |
| 10,802,743 B2 * | 10/2020 | Catthoor ................ G11C 16/04 |
| 10,826,941 B2 | 11/2020 | Jain et al. |
| 10,917,352 B1 | 2/2021 | Hanes et al. |
| 11,032,301 B2 | 6/2021 | Mandrychenko et al. |
| 11,036,856 B2 | 6/2021 | Graun et al. |
| 11,159,419 B1 * | 10/2021 | Roersma ............ H04L 41/0803 |
| 11,281,775 B2 | 3/2022 | Burdett et al. |
| 11,363,095 B1 | 6/2022 | Black et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0120822 A1 * | 6/2003 | Langrind ............ H04L 61/5092 |
| | | 709/251 |
| 2003/0172292 A1 | 9/2003 | Judge |
| 2003/0204632 A1 | 10/2003 | Willebeek-Lemair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2008/0239961 A1 | 10/2008 | Hilerio et al. |
| 2009/0144818 A1 | 6/2009 | Kumar et al. |
| 2009/0249470 A1 | 10/2009 | Litvin et al. |
| 2009/0254663 A1 | 10/2009 | Alperovitch et al. |
| 2009/0300351 A1 | 12/2009 | Lei et al. |
| 2010/0017436 A1 | 1/2010 | Wolge |
| 2010/0135287 A1 | 6/2010 | Hosain et al. |
| 2010/0191862 A1 | 7/2010 | Forbes, Jr. et al. |
| 2011/0119481 A1 | 5/2011 | Auradkar et al. |
| 2011/0145594 A1 | 6/2011 | Jho et al. |
| 2011/0246665 A1 | 10/2011 | Vange et al. |
| 2012/0278896 A1 | 11/2012 | Fang et al. |
| 2013/0077486 A1 | 3/2013 | Keith |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0259093 A1 * | 9/2014 | Narayanaswamy .... H04L 47/20 |
| | | 726/1 |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2015/0317169 A1 * | 11/2015 | Sinha .................... G06F 9/4416 |
| | | 713/2 |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250951 A1 | 8/2017 | Wang et al. |
| 2017/0264640 A1 * | 9/2017 | Narayanaswamy .. G06F 16/951 |
| 2017/0359247 A1 * | 12/2017 | Dixon ................... H04L 45/123 |
| 2018/0026885 A1 * | 1/2018 | Jeuk ........................ H04L 45/64 |
| | | 709/238 |
| 2019/0280964 A1 * | 9/2019 | Michael .............. H04L 43/0876 |
| 2020/0050686 A1 | 2/2020 | Kamalapuram et al. |
| 2022/0045985 A1 * | 2/2022 | Bareket .................... H04L 45/04 |
| 2022/0191301 A1 * | 6/2022 | Muller .................... H04W 4/14 |
| 2022/0385534 A1 * | 12/2022 | Cohen ................ H04L 41/0894 |
| 2024/0049043 A1 | 2/2024 | N et al. |
| 2024/0086216 A1 | 3/2024 | Wakelin et al. |

FOREIGN PATENT DOCUMENTS

| | | |
|---|---|---|
| EP | 1063833 A2 | 12/2000 |
| EP | 3291610 A1 | 3/2018 |
| EP | 3968733 A1 | 3/2022 |
| WO | 2009109803 A1 | 9/2009 |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

(56) References Cited

OTHER PUBLICATIONS

Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.
NIIT, Special Edition Using Storage Area Networks, Que, 2002, 6 pgs.
Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs,.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management for Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

PRIORITIZED TAG BASED VIRTUAL PRIVATE NETWORK CONNECTION

PRIORITY

This application is a continuation of U.S. patent application Ser. No. 18/186,019, filed Mar. 17, 2023, now U.S. Pat. No. 11,968,269, issued Apr. 23, 2024, and entitled "HYBRID TAG BASED VIRTUAL PRIVATE NETWORK WITH SCALABLE NEXT HOP CONVERGENCE," which claims the benefit of and priority to IN Provisional Patent Application No. 20/231,1006913, filed on Feb. 2, 2023, titled "MULTI-TENANT CLOUD NATIVE CONTROL PLANE SYSTEM," which is incorporated by reference in its entirety.

BACKGROUND

This disclosure relates in general to multi-tenant cloud native control plane systems and, but not by way of limitation, to a cloud native control plane and implementation of a tag-based VPN, among other things.

The classic routing model has a control plane and a data plane. The control plane determines the routing table for data packets from a request used by the data plane to forward the data packets. If one of the control plane or the data plane fails, the other of the control or data plane goes down. This leads to quality and latency-related problems in the network. To solve the problems, the control plane and the data plane were separated into different processes, then they were separated into two different hardware units. If the control plane had a bottleneck, a bigger control plane or a larger number of control plane units were used. However, managing two separate boxes right from an operation standpoint and from a network administration standpoint, two different hardware units are used to manage two different technologies. Rack space and power requisites also increased. The solution became inefficient in terms of management and operations of the separate control and data plane structures.

Moreover, a network engineer is often entailed to solve network issues during a team or conference call. Prioritizing a call over others is another problem that entails human intervention. Heavy network congestion further requires prediction and monitoring of the network. Network optimization including the establishment of direct tunnels between gateway endpoints is desired.

SUMMARY

In one embodiment, the present disclosure provides a multi-tenant cloud native system for providing network connections between a plurality of gateway endpoints using prioritized tags and secure tunnels. An end-user device includes a client endpoint for sending a request to a cloud control plane for establishing a network connection with a service endpoint of the gateway endpoint. Tags are assigned to the gateway endpoints in the network and are classified into one or more categories based on tag policies. One or more tags are prioritized for network connection in a prioritizing order. Connectivity of the tags and tunnels between the gateway endpoint are identified from network traffic of devices corresponding to the gateway endpoints. A database of devices with device addresses is identified to determine routes between the gateway endpoints. A secure tunnel is determined from the tunnels based on the tags and the network connection is established via the secure tunnel using the routes.

In an embodiment, a multi-tenant cloud native control plane system for providing network connections between a plurality of gateway endpoints using prioritized tags and secure tunnels. The multi-tenant cloud native control plane system includes an end-user device including a client endpoint, a cloud control plane, and a cloud control plane including a service endpoint. The client endpoint is configured to provide a request for establishing a network connection between the client endpoint and the service endpoint of the plurality of gateway endpoints in a network. The cloud control plane is coupled to the end-user device. A cloud provider is configured to provide data on the service endpoint corresponding to the request. The cloud control plane is configured to receive the request for establishing the network connection. A tenant associated with the request is identified and isolated from a plurality of tenants. Tags are assigned to each gateway endpoint in the network based on tag policies. The tag policies are based on zones associated with the request, tenant specific rules, a user location, the network connection, and/or a priority associated with the plurality of gateway endpoints, and the tag policies specifies connectivity between the tags. The tags are classified into one or more categories based on the tag policies associated with the request. The connectivity of the tags of the plurality of endpoints is identified from network traffic of devices corresponding to the plurality of gateway endpoints. The tags corresponding to the tenant associated with the request are identified. One or more tags are prioritized for the network connection between the gateway endpoints based on the tag policies. A prioritizing order for one or more categorized tags is set in order of a priority of tags. Patterns from the connectivity of the tags are identified. The patterns include connections between the devices, the gateway endpoints, user locations, and/or device addresses. A plurality of tunnels are specified between the tags based on the patterns and the connectivity of the tags. A database of devices is generated with corresponding device addresses. The devices are associated with the corresponding gateway endpoints in the network. The database of devices is exchanged between the plurality of gateway endpoints using a protocol to determine routes between the plurality of gateway endpoints. A secure tunnel is determined from the plurality of tunnels based on the tags corresponding to the tenant. The network connection between the client endpoint and the service endpoint is established via the secure tunnel using the routes between the plurality of gateway endpoints.

In another embodiment, a networking method for implementing a tag-based network configuration for a tenant in a network based on prioritized tags. In one step, a request is received for establishing a network connection between a client endpoint and a service endpoint of a plurality of gateway endpoints in the network. A tenant associated with the request is identified and isolated from a plurality of tenants. Tags are assigned to each gateway endpoint in the network based on tag policies. The tag policies are based on the zones associated with the request, tenant specific rules, a user location, the network connection, and/or a priority associated with the plurality of gateway endpoints, and the tag policies specifies connectivity between the tags. The tags are classified into one or more categories based on the tag policies associated with the request. The connectivity of the tags of the plurality of endpoints is identified from network traffic of devices corresponding to the plurality of gateway endpoints. The tags corresponding to the tenant associated with the request are identified. One or more tags are prioritized for the network connection between the gateway endpoints based on the tag policies. A prioritizing order for one or more categorized tags is set in order of a priority of tags. Patterns from the connectivity of the tags are identified. The patterns include connections between the devices, the gateway endpoints, user locations, and/or device addresses. A plurality of tunnels is specified between the tags based on the patterns and the connectivity of the tags. A database of devices is generated with corresponding device addresses. The devices are associated with the corresponding gateway endpoints in the network. The database of devices is exchanged between the plurality of gateway endpoints using a protocol to determine routes between the plurality of gateway endpoints. A secure tunnel is determined from the plurality of tunnels based on the tags corresponding to the tenant. The network connection is established between the client endpoint and the service endpoint via the secure tunnel using the routes between the plurality of gateway endpoints.

In yet another embodiment, cloud native control plane system for providing communication between a plurality of gateway endpoints for cloud services, the cloud native control plane system comprising a plurality of servers, collectively having code for:

receiving a request for establishing a network connection between a client endpoint and a service endpoint of a plurality of gateway endpoints in a network;

identifying a tenant associated with the request and isolate the tenant from a plurality of tenants;

assigning tags to each gateway endpoint in the network based on tag policies, wherein the tag policies are based on zones associated with the request, tenant specific rules, a user location, the network connection, and/or a priority associated with the plurality of gateway endpoints, and the tag policies specify connectivity between the tags;

classifying the tags into one or more categories based on the tag policies associated with the request;

identifying the connectivity of the tags of plurality of endpoints from network traffic of devices corresponding to the plurality of gateway endpoints;

identifying the tags corresponding to the tenant associated with the request;

prioritizing one or more tags for the network connection between the gateway endpoints based on the tag policies, wherein a prioritizing order for one or more categorized tags are set in order of a priority of tags;

identifying patterns from the connectivity of the tags, wherein the patterns include connections between the devices, the gateway endpoints, user locations and/or device addresses;

specifying a plurality of tunnels between the tags based on the patterns and the connectivity of the tags;

generating a database of devices with corresponding device addresses, wherein the devices are associated with the corresponding gateway endpoints in the network;

exchanging the database of devices between the plurality of gateway endpoints using a protocol to determine routes between the plurality of gateway endpoints;

determining a secure tunnel from the plurality of tunnels based on the tags corresponding to the tenant; and establishing the network connection between the client endpoint and the service endpoint via the secure tunnel using the routes between the plurality of gateway endpoints.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
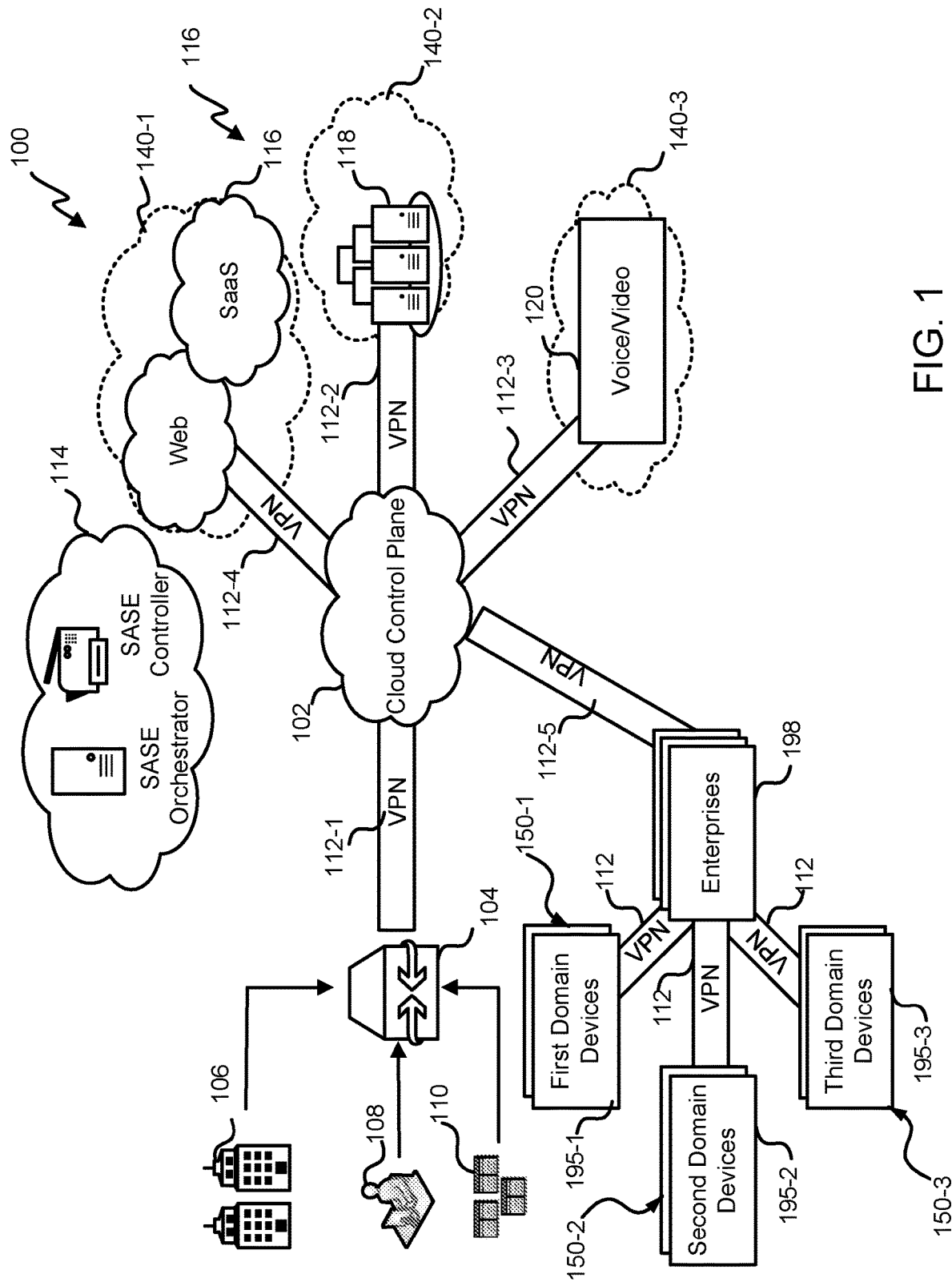
FIG. 1 illustrates a block diagram of an embodiment of a cloud native control plane system.

Referring first to FIG. 1, a block diagram of an embodiment of a cloud native control plane system 100 allowing multiple-tenants in different domains to communicate with various cloud providers over the public internet is shown. The cloud native control plane system 100 may be a multi-tenant cloud native control plane system or a single-tenant cloud native control plane system. The cloud native control plane system 100 includes a plurality of servers. The cloud native control plane system 100 allows multiple tenants/ multi-tenant systems or enterprises to use the same network separated by domain or some other logical separation. Encryption, leased/encrypted tunnels, firewalls, and/or gateways can be used to keep the data from one enterprise 198 separate from other enterprise(s) 198. Individual end-user device 195 of an end-user 122 can communicate with a gateway device 104 and a cloud control plane 102 for services and storage using a public internet (not shown). The cloud control plane 102 provides multi-tenancy control, policies, and routing for individual domain. The cloud native control plane system 100 may include a plurality of servers. Sites 106, client devices 108, and Internet of Things (IoT) devices 110 are connected to the gateway device 104.

The cloud native control plane system 100 may include a first computing environment 150-1 having end-user devices 195-1 for a first domain, a second computing environment 150-2 having end-user devices 195-2 for a second domain, and a third computing environment 150-3 having end-user devices 195-3 for a third domain. Individual domain communicates with its respective enterprise 198 using a virtual private network (VPN) 112 over local area networks (LANs), wide area networks (WANs), and/or the public Internet. Instead of a VPN 112 as an end-to-end path, tunneling (e.g., Internet Protocol in Internet Protocol (IP-in-IP), Generic Routing Encapsulation (GRE)), policy-based routing (PBR), Border Gateway Protocol (BGP)/Interior Gateway Protocol (IGP) route injection, or proxies could be used. In one embodiment, the gateway device 104 may be a Secure access service edge (SASE) gateway spoke and the cloud control plane 102 may be a SASE gateway hub in a hub-spoke network. The gateway device 104 selects the closest data center (the cloud control plane 102), establishes tunnels, and performs intelligent app-aware traffic steering. The cloud control plane 102 or the data center provides site-to-site optimized connectivity for critical apps and traffic (especially voice/video). The gateway device 104 is connected to the cloud control plane via VPN 112-1. Cloud providers 140 for providing remote services may include public or private clouds including Web/Software as a service (SaaS) 116, SASE gateway public/private datacenter 118, and voice/video 120 connected to the cloud control plane 102 via VPN 112-4, VPN 112-2, and VPN 112-3 respectively. Enterprises 198 are connected to the cloud control plane 102 using the VPN 112-5. Some examples of cloud provider(s) 140 include Amazon Web Services (AWS)®, Google Cloud Platform (GCP)®, and Microsoft Azure®. Some or all of the cloud provider(s) 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud provider(s) 140 are shown, any suitable number of cloud provider(s) 140 may be provided with some captive to a particular enterprise or otherwise not accessible to multiple domains.

Each of the cloud providers 140 may communicate with the public Internet using a secure connection. For example, the first cloud provider 140-1 may communicate with the public Internet via a virtual private network (VPN) 112, the second cloud provider 140-2 may communicate with the public Internet via a different VPN 112, and the third cloud provider 140-3 may communicate with the public Internet via yet another VPN 112. Some embodiments could use leased connections or physically separated connections to segregate traffic. Although one VPN 112 is shown, it is to be understood that there are many VPNs to support different end-user devices, tenants, domains, etc.

A plurality of enterprises 198 may also communicate with the public Internet and the end-user devices 195 for their domain via VPNs 112. Some examples of the enterprises 198 may include corporations, educational facilities, governmental entities, and private consumers. Each enterprise may support one or more domains to logically separate their networks. The end-user devices 195 for each domain may include individual computers, tablets, servers, handhelds, and network infrastructure that are authorized to use computing resources of their respective enterprise 198.

Further, the cloud control plane 102 may communicate with the public Internet via a VPN 112. The cloud control plane 102 also provides cloud access security broker (CASB) functionality for cloud security to the enterprises 198 with data flows of the CASB being regulated with a global cloud traffic controller (GCTC). Communication between the cloud control plane 102 and the cloud provider(s) 140 for a given enterprise 198 can be either a VPN connection or tunnel depending on the preference of the enterprise 198. The cloud control plane 102 may configure, test, and enforce user and/or group policies and routing across the cloud native control plane system 100. For example, the cloud control plane 102 may ensure that the policies are consistent across the cloud providers 140, enterprises 198 and computing environments 150. The cloud control plane 102 provides proxies to cloud providers and may apply various policies. The connection between end-user devices 195 and the cloud control plane 102 is over an encrypted VPN 112 or tunnel. SASE Orchestrator and SASE Controller 114 is cloud native management and controller which is SaaS and multi-tenant compliant.

Figure 2:
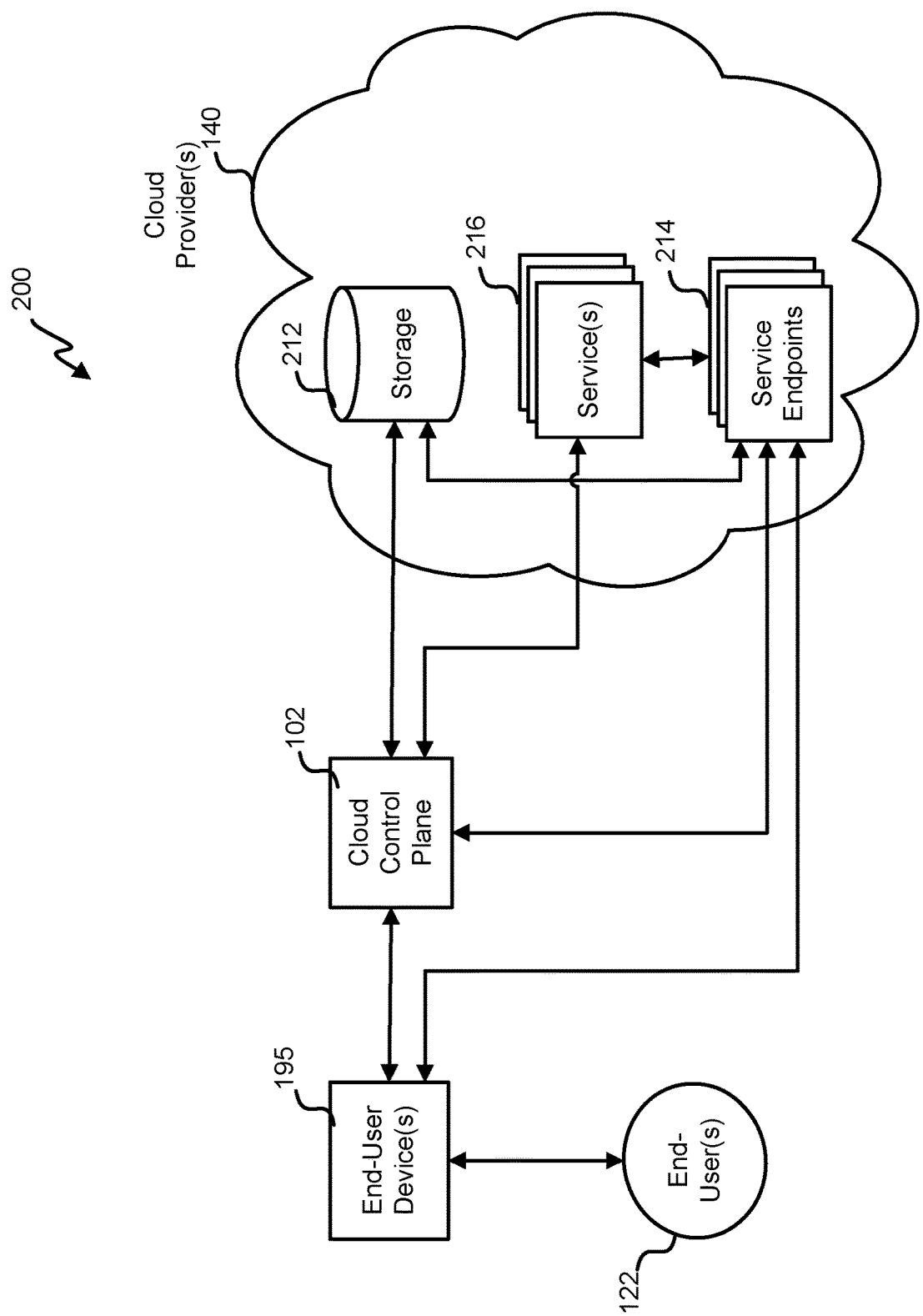
FIG. 2 illustrates a block diagram of an embodiment of a single-tenant cloud native control plane system where an end-user device communicates with a cloud provider.

With reference to FIG. 2, a block diagram of an embodiment of a single-tenant cloud native control plane system 200 where an end-user device 195 communicates with a cloud provider 140 is shown. The end-user device 195 is operated by an end-user 122. The cloud provider 140 is accessible directly or through the cloud control plane 102 depending on the route chosen, services, policies, etc. Included in the cloud provider 140 are services 216 such as storage 212 that enable applications and functionality on the end-user devices 195.

Service endpoints 214 are provided in the cloud provider 140 to enable communication with the cloud control plane 102 and end-user devices 195. The service endpoints 214 may include VPN terminations and proxies that provide for secure tunnels with the cloud control plane 102 and/or the end-user devices 195. The cloud control plane 102 can optionally connect directly with the services 216 and the storage 212 of the cloud provider 140 without using the service endpoints 214. In some cases, the end-user device 195 communicates with the services 216 and the storage 212 through the cloud control plane 102 depending on route preference and policies.

Figure 3:
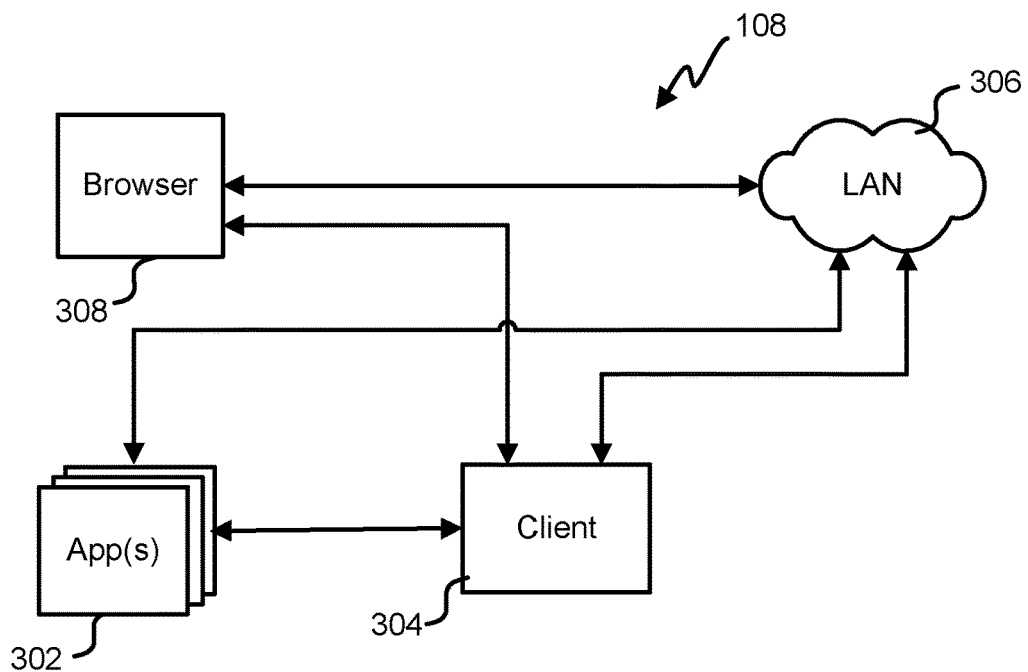
FIG. 3 illustrates a block diagram of an embodiment of an end-user device that includes a client for enabling enhanced routing control.

Referring next to FIG. 3, a block diagram of an embodiment of an end-user device 195 that includes a client 304 for enabling enhanced routing control is shown. The end-user device 195 includes applications (apps) 302 and a browser 308 that use the client 304 for communication over the LAN 306 and ultimately to the cloud provider(s) 140 (not shown). The browser 308 and the app ( ) 302 can be redirected using domain name services (DNS) to use the client 304. Alternatively, the browser 308 and the app(s) 302 may natively support the client 304 to utilize Application Programming Interfaces (APIs) or other communication to select policies and receive the corresponding user groups and/or user profiles.

Figure 4:
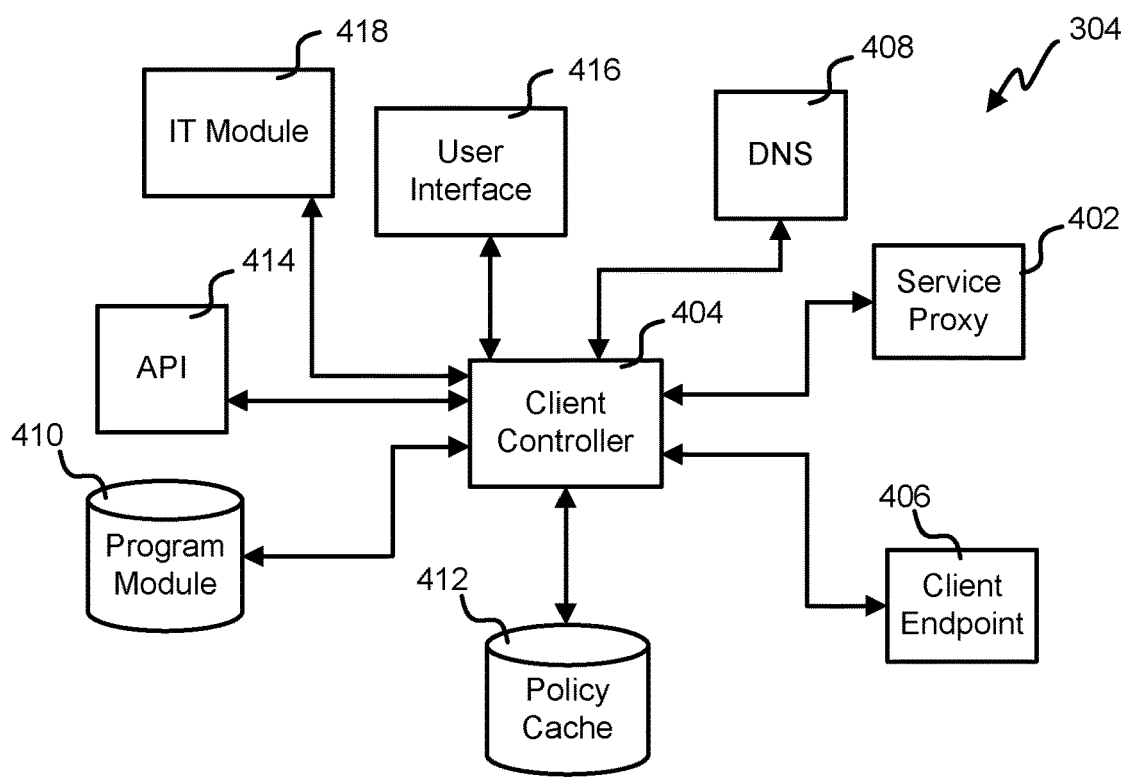
FIG. 4 illustrates a block diagram of an embodiment of a client.

Referring next to FIG. 4, a block diagram of an embodiment of a client 304 is shown that can specify by the policies and provide information which specifies grant to cloud services under the management of a client controller 404. The client controller 404 configures a DNS 408, fulfills API requests, populates routes, specifies the user and/or group policies, acquires the user directory information from a user interface 416, and a policy cache 412 for the selection of the policies. In operation, the client controller 404 configures data and service requests over the cloud native control plane system 100.

The user interface 416 acts as a portal for the end-user(s) 122 to enter data and view information displays. The user interface 416 leverages the program module 410.

The client 304 can be specified for use with a DNS 408 which redirects traffic from browsers 308 and the app(s) 302 to go through the client 304. Without changing any apps 302 or the browser 308, the client 304 can process traffic for the single-tenant cloud native control plane system 100. The client 304 can operate as a proxy using service proxy 402 or a VPN using the client endpoint 406. An API 414 is provided for the app(s) 302 to configure the client 304 if they have that capability. The cloud control plane 102 may also configure the client 304.

The cloud control plane 102 sends relevant policies to the policy cache 412 to provide functionality to the client 304. The policies allow specifying tunnels or connections for providing a service requested by the end-user device 195 to use. The policies include network policies and tag policies. The network policies specify routing information based on the tenant specific rules, applications, user locations, network, preferences, and/or priorities associated with the end-user device 195. The tenant specific rules include restrictions on data access, connection, and network imposed by the tenant on the end-user(s) 122. For example, use Voice over Internet Protocol (VOIP) over wired network connections. The tag policies specify tags for endpoints (or endpoint gateways) of a network. The tag policies are based on tenant specific rules, a user location, a network connection, and/or a priority associated with the plurality of gateway endpoints, and the policy specifies connectivity between the tags.

Table 1 gives examples of network policies along with examples as deployed by the cloud control plane 102.

TABLE 1

| Routing | Tunnel | Tenant | Network Policies |
| --- | --- | --- | --- |
| Routes A, B | Tunnel 1 | Enterprise 1 | Printer access in the office from home |
| Routes A, D | Tunnel 2 | Enterprise 2 | Access social media using VPN 1 |
| Routes C, D, B | Tunnel 5 | Enterprise 3 | Direct connection on team calls |
| Route A | Tunnel 2 | Enterprise 4 | Fastest route on a secure network |
| Route B | Tunnel 2 | Enterprise 5 | Remote access on tunnel 2 |

A request for service is sent by the end-user 122 from the end-user device 195. The request is initiated through the gateway device 104 for access to the service in terms of data or content site, application, or browser, the request is forwarded by the gateway device 104 to the cloud control plane 102 by sending data packets. The network policies define the routing for access to the data. The network policies define routes and corresponding tunnels based on the enterprise 198 or the tenant of the end-user(s) 122 for establishing the connection with the cloud provider 140 for the service. From examples in table 1, a policy for accessing a printer in the office of enterprise 1 from home defines routes A and route B using tunnel 1 for providing the printout. Another policy for accessing social media using VPN 1 may be specified for routes A, D, using tunnel 2 and enterprise 2. Similarly, the network policies for direct connection for team calls, taking the fastest route on a secure network for important meetings, and remote work-from-home access on tunnel 2 for corresponding routes, tunnels, and enterprises as mentioned in table 1.

Table 2 gives examples of tag policies along with examples as deployed by the cloud control plane 102.

TABLE 2

| Tag | Tunnel | Tenant | Tag Policies |
| --- | --- | --- | --- |
| Blue Tags (Tag 1, Tag 4) | Tunnel 1 | Enterprise 1 | Select blue tag, prioritize VPN connection for team call |
| Green Tags (Tag 2, Tag 4) | Tunnel 2 | Enterprise 2 | Select green tag, prioritize VPN connection for Manager |
| Yellow Tags (Tag 3, Tag 1) | Tunnel 5 | Enterprise 3 | Select yellow tag, prioritize yellow tag over green tag |
| Red Tags (Tag 2, Tag 5) | Tunnel 2 | Enterprise 4 | Select green tag, prioritize blue, green, and yellow tags over red tag |
| White Tags (tag 1 and tag 2) | Tunnel 6 | Enterprise 1, 2, 3 | Select white tag when all other tags are busy |

For setting up tag based VPN connection, tags are assigned for each gateway endpoint in a network such as the cloud native control plane system 100 based on a policy as shown in table 2. The policy specifies connectivity between the tags via tunnels. The tags specify a direct tunnel between the endpoints of the tags in order to establish a direct connection between the endpoints. The connection may be a VPN connection. For example, a tag policy specifies blue tags between tag 1 and tag 4 using tunnel 1 based on enterprise 1 requisites. Blue tag will be selected for establishing VPN connection for team call. Green tag between tag 2 and tag 4 will specify green tags for VPN connection for manager of enterprise 2 using tunnel 2. Yellow tag between tag 3 and tag 1 will specify tunnel 5 for enterprise 3. Yellow tags will be prioritized over green tag based on the tag policy. Red tags between tag 2 and tag 5 will specify tunnel 2 for enterprise 4. The blue, green, and yellow tags will be prioritized over the red tags for connection. Similarly, white tags between tag 1 and tag 2 will specify tunnel 6 for enterprise 1, enterprise 2, and enterprise 3. The white tags will be selected when all other tags are busy.

The program module 410 includes a software logic that helps in integration with external or third-party solutions for the domain and the enterprise 198 by the cloud control plane 102.

An Information Technology (IT) module 418 provides the administrators of enterprise 198 to enable and/or disable the user policies and/or group policies. Access to particular websites, the cloud provider(s) 140, and/or access to certain features within software of the enterprise 198. Alerts related to threats are indicated to the end-user(s) 122 via the user interface 416 by the administrators using the IT module 418.

The client endpoint 406 is used to establish the connection with the service endpoint 214 using the gateway device 104 for initiating the request for data from the cloud providers 140 via the cloud control plane 102.

Figure 5:
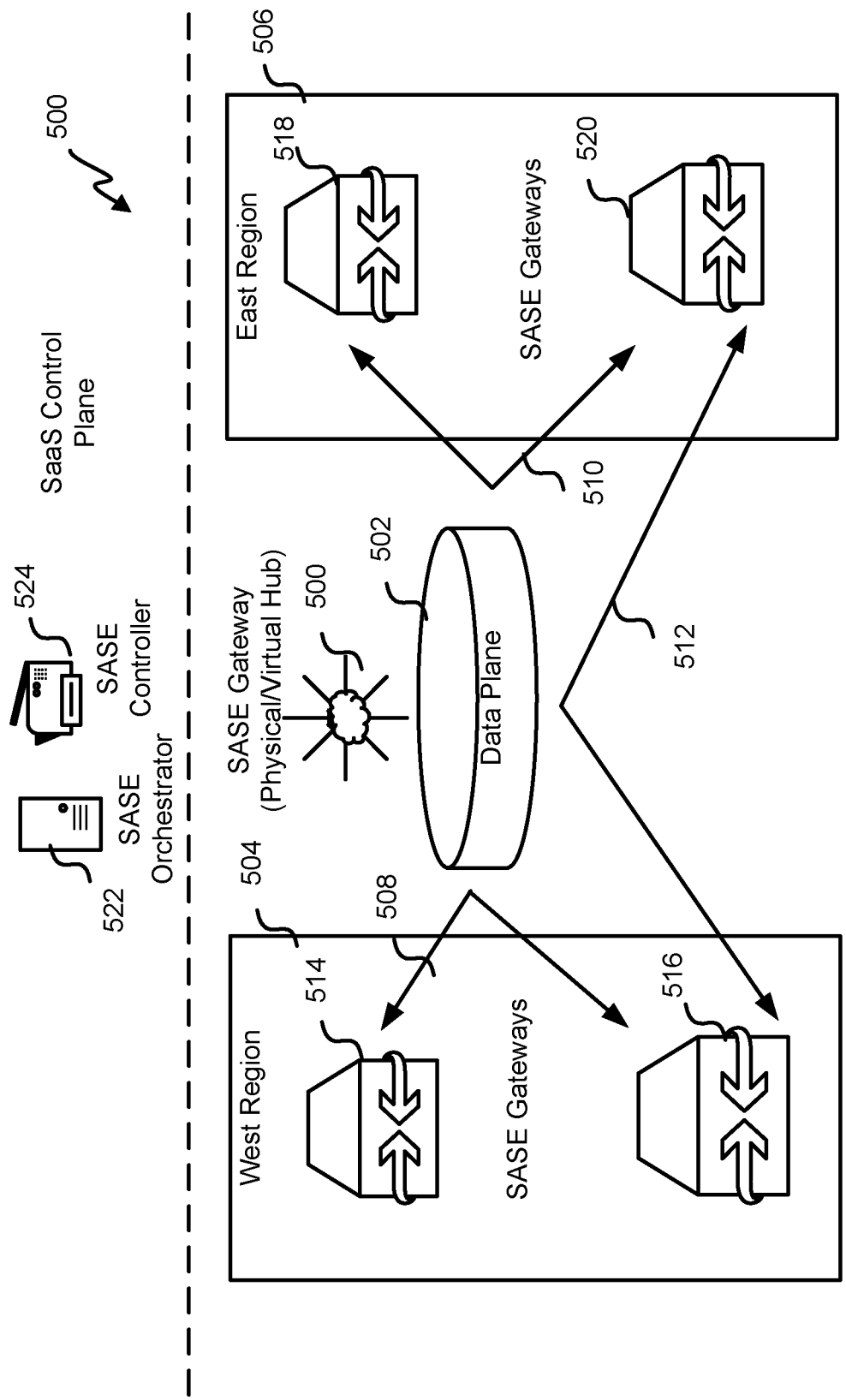
FIG. 5 illustrates an overview of a block diagram of an embodiment of a tag allocation by a cloud control plane.

Referring next to FIG. 5, an overview of an example of an embodiment 500 of tag allocation by a cloud control plane 102 is shown. The cloud control plane 102 assigns tags to each gateway endpoint 514, 516, 518, and 520 in a network of the cloud native control plane system 100. A SASE gateway (physical/hub) 500 in the cloud control plane 102 controls the implementation of the tags. The cloud control plane 102 assigns tags to the endpoints based on tag policies. The tag policies are based on tenant specific rules, an end-user location, a network connection of the end-user(s) 122, and/or a priority associated with the gateway endpoints. The tag policies specify connectivity between the tags. A data plane 502 is responsible for forwarding data packets based on the incoming request from the end-user device 195 and a control plane provides routing information to the data plane which defines the forwarding of the data packets by the data plane 502. The control plane is in the cloud control plane 102. The SASE gateway 500 identifies dynamic zones or regions from the incoming request.

The SASE gateway 500 identifies west region 504 and east region 506 with corresponding gateway endpoints 514, 516, 518, and 520 as zones. Tag 508 is assigned to the gateway endpoint 514 and the gateway endpoint 516 for communication between the gateway endpoint 514, and the gateway endpoint 516 in the west region. Similarly, tag 510 is assigned to the gateway endpoint 518 and the gateway endpoint 520 for communication between the gateway endpoint 518, and the gateway endpoint 520 in the east region. Tag 512 is assigned to the gateway endpoint 516 and the gateway endpoint 520 for communication between the gateway endpoint 516 in the west region and the gateway endpoint 520 in the east region. SASE Orchestrator 522 and SASE Controller 524 in the SasS control plane assist the SASE gateway 500 in controlling and implementing the tags in the network for communication in the cast and west regions. In the example, east and west regions have been identified for communication. However, other regions, locations, and/or zones may be identified for communication.

Figure 6:
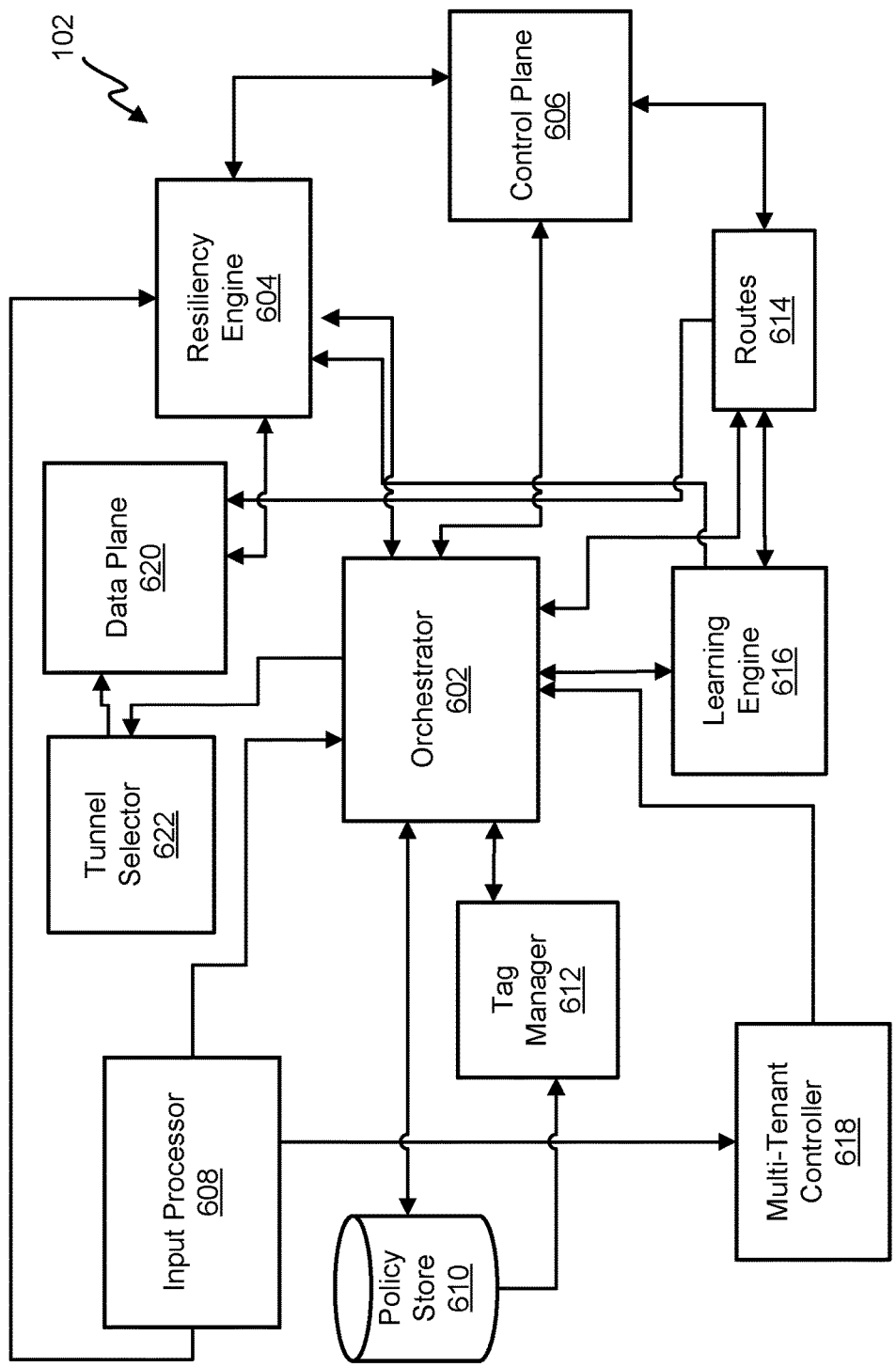
FIG. 6 illustrates an overview of a block diagram of a cloud control plane.

Referring next to FIG. 6, an overview of a block diagram of the cloud control plane 102 is shown. The cloud control plane 102 provides the incoming requests from the end-user(s) 122 via the gateway device 104 to the cloud provider(s) 140. The cloud control plane 102 includes the control plane responsible for providing routing information for the data plane. The data plane forwards the data packets corresponding to the incoming requests. The cloud control plane 102 includes an orchestrator 602, a resiliency engine 604, a control plane 606, an input processor 608, a policy store 610, a tag manager 612, routes 614, a learning engine 616, a multi-tenant controller 618, a data plane 620, and a tunnel selector 622.

The orchestrator 602 provides the data exchange and tag control based on respective network and tag policies. The orchestrator 602 receives the incoming requests from the end-user(s) 122 using their end-user device 195. The request is provided via the gateway device 104. The request is for accessing data, content, browsing, accessing websites, applications, etc. The request is provided to the cloud provider 140. The orchestrator 602 receives the request from the input processor 608. The gateway device 104 provides data packets corresponding to the incoming request to the orchestrator 602. The orchestrator 602 provides the data packets to the control plane 606. The orchestrator 602 provides the network policies from the policy store 610 corresponding to the request to the control plane 606 along with the data packets. The orchestrator 602 further identifies region, zone or location associated with the request. The orchestrator 602 provides the request to the tag manager 612 for managing communication with the tags assigned to the gateway endpoints.

The policy store 610 includes the network policies and the tag policies. The policies are predefined either by an administrator, an enterprise 198, and/or the end-user 122. The network policies are based on tenant specific rules, applications, user locations, networks, preferences, and/or priorities. The tag policies are based on tenant specific rules, a user location, a network connection, and/or a priority associated with the plurality of gateway endpoints, and the policy specifies connectivity between the tags.

The multi-tenant controller 618 identifies the tenant from the request. The tenant identification and tenant isolation are performed by the multi-tenant controller 618. The request includes a tenant identifier or tenant ID which is used to identify the tenant of the end-user(s) 122 sending the request. The tenant identified is provided to the orchestrator 602 for policy identification.

The tag manager 612 identifies, assigns, and manages tags using the tag policies from the policy store 610. The control plane 606 uses the network policies from the orchestrator 602 to identify routing information for the data plane 620 that will process the data packets forwarding the data packets based on the routing information. The control plane 606 uses the network policies to identify the routing information specifically routing tables for the data plane 620. The network policies are based on network patterns from the network traffic received from the input processor 608. The control plane 606 identifies routes 614 including the routing information or the routing tables using the network policies and provides to the data plane 620 for forwarding the data packets to meet the requests. The routes 614 are provided to the learning engine 616 for analyzing the patterns of the requests and the corresponding routes that are identified.

The learning engine 616 identifies network patterns from the routing information of network traffic from a number of end-user devices 195 associated with a number of tenants. Machine learning algorithms, fuzzy logic, or the network patterns include connections between the end-user devices 195, the gateway endpoints, user locations, and/or device addresses. The network patterns are provided to the orchestrator 602 which is used to identify the network policies from the policy store 610. The learning engine 616 also provides the network patterns to the resiliency engine 604. The resiliency engine 604 identifies the status of the control plane 606 and the data plane 620 from the network patterns and the network traffic from the input processor 608 and signals from the data plane 620 and the control plane 606. The status includes a working condition of the control plane and the data plane. When either the data plane 620 or the control plane 606 fails, the status is identified by the resiliency engine 604 and indicated to the orchestrator 602 which initiates the data communication using the other one which is in a good health. The network does not go down and the request is fulfilled using the orchestrator 602.

In case the data plane 620 fails, the control plane 606 forwards the routing information to the orchestrator 602 that forwards the data packets to the cloud provider 140 on the routes 614 via a secure tunnel in order to meet the request. In case the control plane 606 fails, the data plane 620 forwards the data packets using the routing information from the orchestrator 602 in order to meet the request. The routes 614 and the secure tunnel are learned by the learning engine 616 from the past and current network patterns and network policies and provide the routes to the orchestrator 602 for selecting the secure tunnel and providing it to the data plane 620 for processing the request by forwarding the data packets on the secure tunnel.

The tunnel selector 622 identifies the secure tunnel from a number of tunnels for providing access to the data based on the policy using the network patterns from the routing information. The data packets are forwarded by the data plane 620 for providing the access to the data. The data packets are forwarded to the cloud provider(s) 140 on the secure tunnel using the routing information from the control plane 606. The access to the requested data is provided by the cloud provider(s) 140 which is pushed back to the end-user device 195 using the secure tunnel and displayed to the end-user(s) 122.

An example, a printer access initiated from an end-user(s) 122 at a home location to an office is requested which is met based on the tenant policies for remote work access. The printer access is provided using a secure tunnel and the printer access is provided using the secure tunnel.

Figure 7:
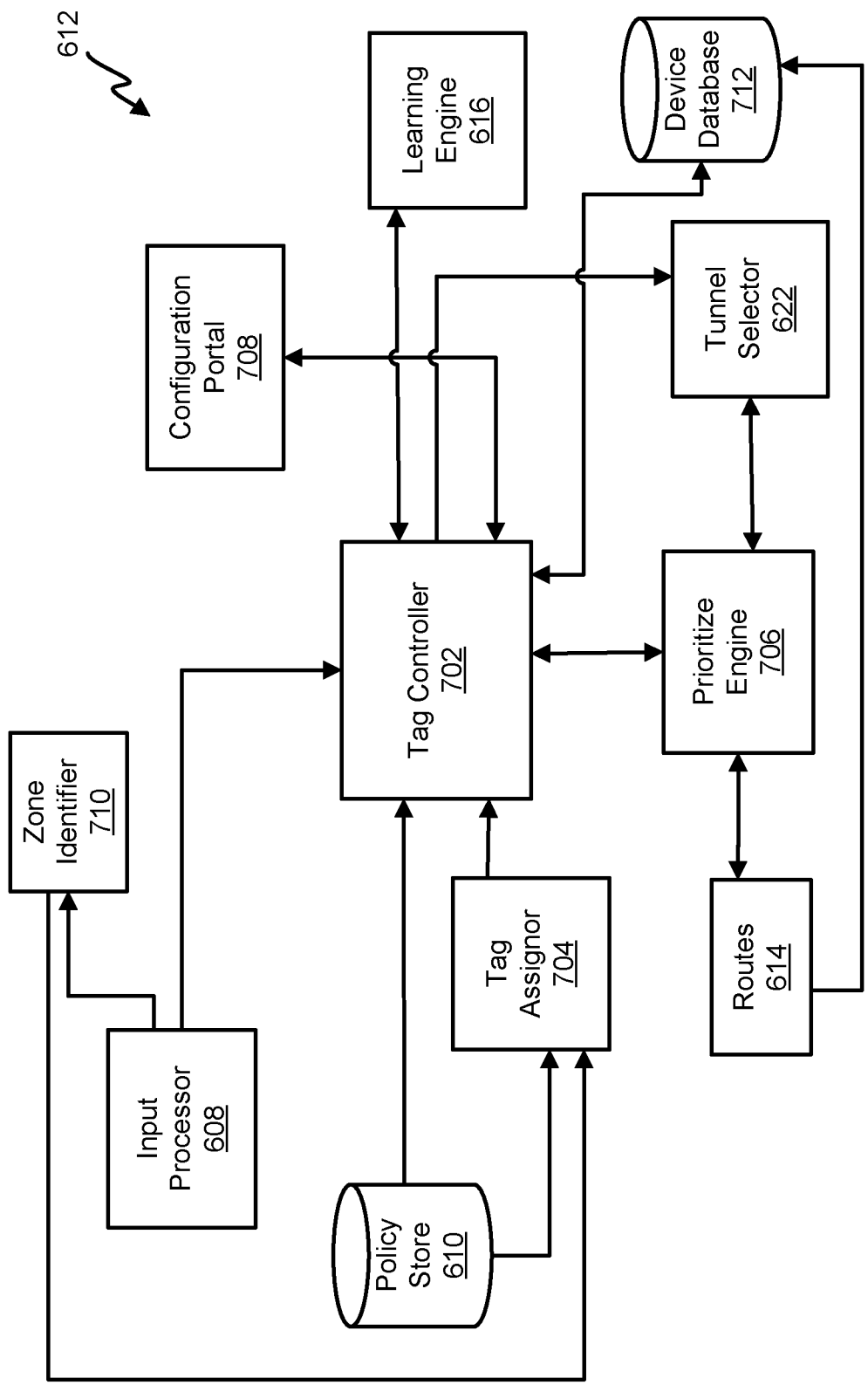
FIG. 7 illustrates an overview of a block diagram of a tag manager.

Referring next to FIG. 7, an overview of a block diagram of the tag manager 612 is shown. The tag manager 612 assigns tags to the gateway endpoints in the cloud native control plane system 100 and manages the tags using the tag policies from the policy store 610. The tags are identified by the tag manager 612 based on the tag policies set by the enterprise 198, administrator, and/or the end-user(s) 122. The tag manager 612 includes a tag controller 702, a tag assignor 704, a prioritize engine 706, a configuration portal 708, a zone identifier 710, and a device database 712. An end-user(s) 122 uses the end-user device 195 on one gateway endpoint to request a connection to another gateway endpoint. The locations of the gateway endpoints may be different. For example, an end-user(s) 122 in the California office may request a connection for a meeting with another office in India. The data centers and the gateway endpoint are based in the corresponding locations. The locations of connection are different and in different zones a gateway endpoint in California in the west zone communicates to a gateway endpoint in India in the east zone. The gateway endpoints connect the corresponding end-users 122 in the zones for communication. The request is received from the input processor 608 by the tag controller 702 for processing the request.

The tag controller 702 manages the tag assignment and allows communication between the gateway endpoints using the tags. The tag controller 702 assigns the tags to each gateway endpoint in the cloud native control plane system 100 based on the tag policies from the policy store 610. The tag policies are based on tenant specific rules, a user location, a network connection, and/or a priority associated with setting a priority of access to the gateway endpoints. The tag policies specify connectivity between the tags.

The zone identifier 710 uses the request from the input processor 608 to identify a location or zone from where the request is initiated. The zone identifier 710 uses location identifiers in the request to identify the location of the request. The location is used to identify a zone associated with the request based on the location of the request. An example of the zone is California, Los Angeles, etc. The identified zone and location are provided to the tag assignor 704 for processing the tags for the gateway endpoints.

The tag assignor 704 uses the tag policies from the policy store 610 to assign the tags to each gateway endpoint in a network of the cloud native control plane system 100. The assigned tags may be referred to as blue tags, green tags, red tags, or yellow tags based on the tag policies associated with the request. For example, blue tags connect the east and west zones for tenant A for meetings, calls, or applications. Green tags connect offices in the cast zone only, red tags connect enterprises 198 in the west zone only, and yellow tags connect calls in the west zone with those in the cast zones.

The tag policies further specify tunnels corresponding to the enterprises 198 connections and the end-user(s) 122 activities. The network policies, the tag policies, and priorities of the tags for connection may be set by the administrator, the end-user(s) 122, or the enterprise 198 using the configuration portal 708. The configuration portal 708 is accessed by the administrator to set the network and tag policies.

The prioritize engine 706 analyzes the different tags for facilitating the connection request. The connection may be a VPN connection. A priority of the tags may be predefined by enterprises 198 and/or based on the tag policies. For example, the green tag may be preferred over the yellow tag or red tag. The tunnels via the green tags are preferred over the tunnels with yellow and red tags. An order of priority like green, yellow, red, and blue may be set in order of priority. The priority of the tags is provided to the tag controller 702 for managing the tags based on the priority.

The learning engine 616 identifies patterns from the connectivity of the tags. The patterns include connections between the devices, the gateway endpoints, user locations, and/or device addresses. The learning engine 616 provides the patterns to the tag controller 702 for specifying a number of tunnels between the tags based on the patterns and the connectivity of the tags. The device database 712 includes a database of devices of the gateway endpoints with corresponding device addresses. The database of devices is exchanged between the gateway endpoints using a protocol to establish the connection using the routes 614 between the gateway endpoints. The device addresses are used to connect the end-user device(s) 122.

The tunnel selector 622 identifies a secure tunnel from a number of tunnels based on the tags. The connection between the gateway endpoints is established via the secure tunnel using the routes 614.

Figure 8:
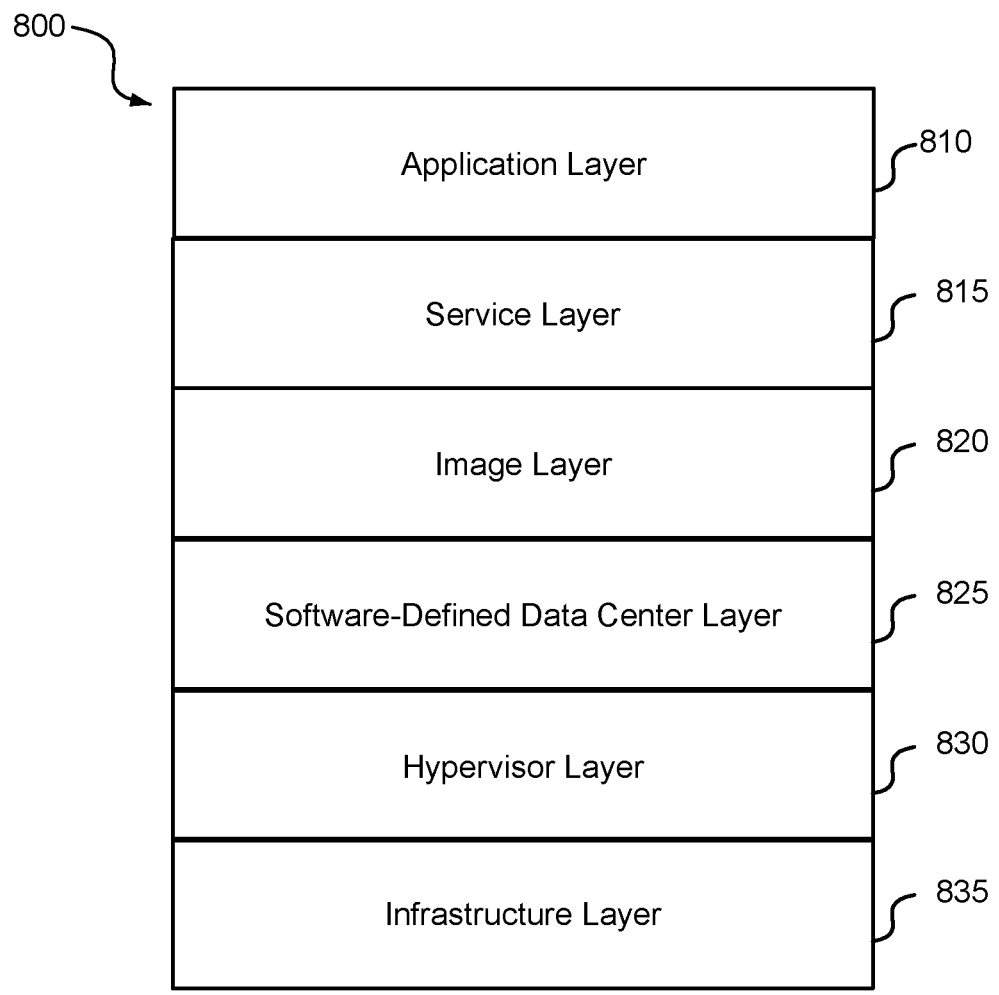
FIG. 8 illustrates a block diagram of an embodiment of a cloud OSI model for cloud computing environments.

Referring next to FIG. 8, a block diagram of an embodiment of a cloud OSI model for cloud computing environments is shown. The cloud OSI model 800 for cloud computing environments partitions the flow of data in a communication system into six layers of abstraction. The cloud OSI model 800 for cloud computing environments may include, in order, an application layer 810, a service layer 815, an image layer 820, a software-defined data center layer 825, a hypervisor layer 830, and an infrastructure layer 835. Each layer serves a class of functionality to the layer above it and is served by the layer below it. Classes of functionality may be realized in software by various communication protocols.

The infrastructure layer 835 may include hardware, such as physical devices in a data center, that provides the foundation for the rest of the layers. The infrastructure layer 835 may transmit and receive unstructured raw data between a device and a physical transmission medium. For example, the infrastructure layer 835 may convert the digital bits into electrical, radio, or optical signals.

The hypervisor layer 830 may perform virtualization, which may allow the physical devices to be divided into virtual machines that can be bin packed onto physical machines for greater efficiency. The hypervisor layer 830 may provide virtualized compute, storage, and networking. For example, OpenStack® software that is installed on bare metal servers in a data center may provide virtualization cloud capabilities. The OpenStack® software may provide various infrastructure management capabilities to cloud operators and administrators and may utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 825 may provide resource pooling, usage tracking, and governance on top of the hypervisor layer 830. The software-defined data center layer 825 may enable the creation of virtualization for the Infrastructure-as-Code concept by using representational state transfer (REST) Application Programming Interfaces (APIs). The management of block storage devices may be virtualized, and end users may be provided with a self-service API to request and consume those resources without requiring any knowledge of where the storage is deployed or on what type of device. Various compute nodes may be balanced for storage.

The image layer 820 may use various operating systems and other pre-installed software components. Patch management may be used to identify, acquire, install, and verify patches for products and systems. Patches may be used to correct security and functionality problems in software. Patches may also be used to add new features to operating systems, including security capabilities. The image layer 820 may focus on the compute instead of storage and networking. The instances within the cloud computing environments may be provided at the image layer 820.

The service layer 815 may provide middleware, such as functional components that applications use in tiers. In some examples, the middleware components may include databases, load balancers, web servers, message queues, email services, or other notification methods. The middleware components may be defined at the service layer 815 on top of particular images from the image layer 820. Different cloud computing environment providers may have different middleware components.

The application layer 810 may interact with software applications that implement a communicating component. The application layer 810 is the layer that is closest to the end-user(s) 122 and allows the identification of the routing information of the network traffic and the determination of the secure tunnel for providing the access to the data. The application layer 810 allows the determination of the tunnel for establishing the network connection. Functions of the application layer 810 may include identifying communication partners, determining resource availability, and synchronizing communication. Applications within the application layer 810 may include custom code that makes use of middleware defined in the service layer 815.

Various features discussed above may be performed at one or more layers of the cloud OSI model 800 for cloud computing environments. For example, translating the general policies into specific policies for different cloud computing environments may be performed at the service layer 815 and the software-defined data center layer 825. The policies and the tokens operate at application layer 810. Various scripts may be updated across the service layer 815, the image layer 820, and the software-defined data center layer 825. Further, APIs and policies may operate at the application layer 810 which is at a web browser.

Individual cloud computing environments may have different service layers 815, image layers 820, software-defined data center layers 825, hypervisor layers 830, and infrastructure layers 835. Further, each of the different cloud computing environments may have an application layer 810 that can make calls to the specific policies in the service layer 815 and the software-defined data center layer 825. The application layer 810 may have substantially the same format and operation for individual cloud computing environments. Accordingly, developers for the application layer 810 may not need to understand the peculiarities of how each of the cloud computing environments operates in the other layers.

Figure 9:
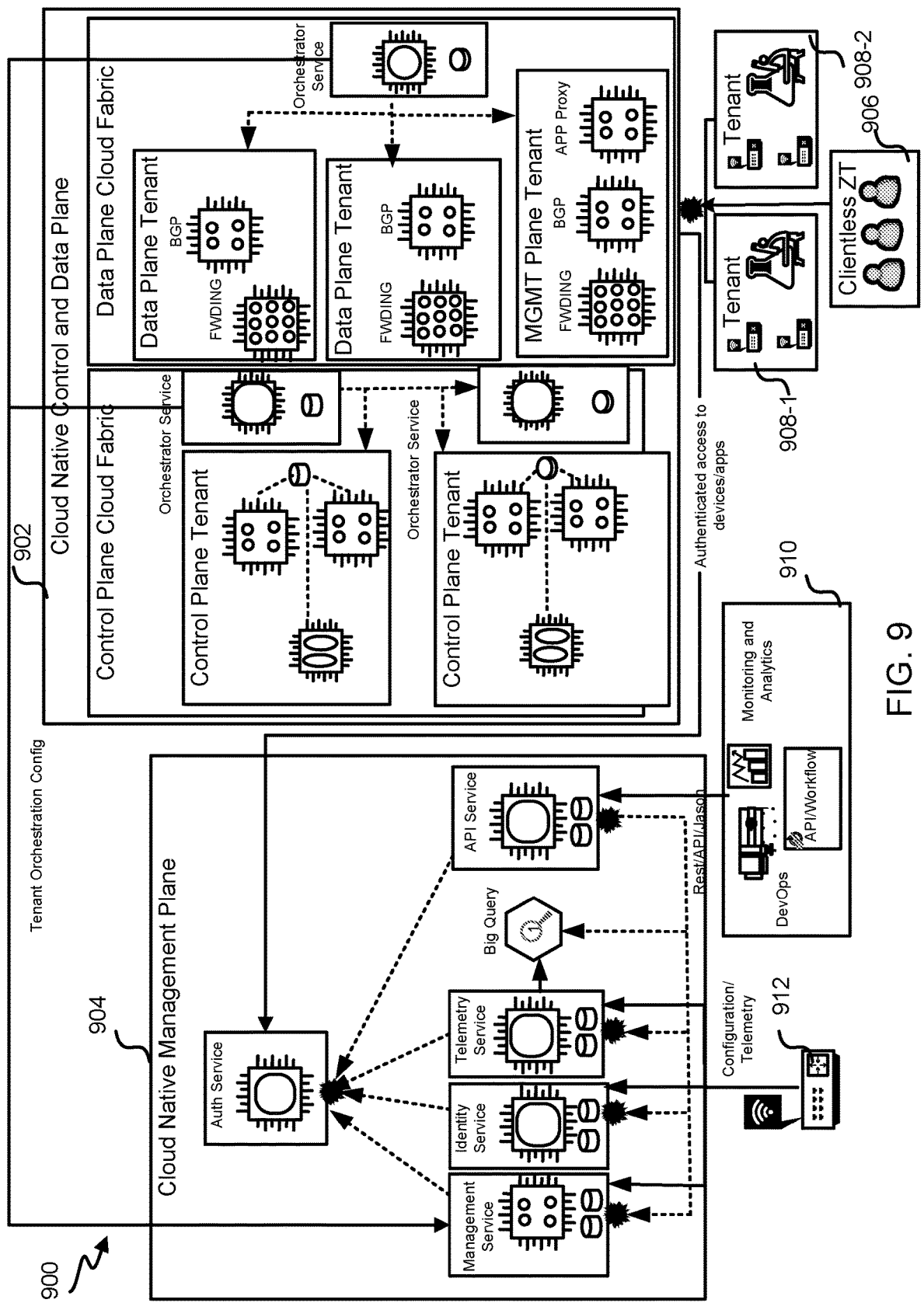
FIG. 9 illustrates a structural diagram of a multi-tenant cloud native control plane system.

Referring next to FIG. 9, a structural diagram of a multi-tenant cloud native control plane system 900 is shown. The multi-tenant cloud native control plane system 900 is the cloud native control plane system 100 with multiple tenants and multiple clouds. The multi-tenant cloud native control plane system 900 includes a cloud native control and data plane 902, a cloud native management plane 904, client devices 906, tenants 908 (including tenant 908-1 and tenant 908-2), a monitoring and analytics system 910, and a gateway device 912. The separation of the control plane cloud fabric and the data plane control fabric provides enhanced resiliency to the system.

The cloud native control and data plane 902 includes the control plane cloud fabric for performing the functions of the cloud plane including identifying routing information for data packets of request and providing the routing information to the data plane cloud fabric. The data plane cloud fabric includes the data plane for forwarding the data packets to a service provider (not shown) based on the routing information received from the control plane. The control plane cloud fabric includes control plane tenants corresponding to the different tenants 908. Similarly, the data plane cloud fabric includes data plane tenants corresponding to the different tenants 908.

An orchestrator service performs operational and functional processes involved in providing the service in the control plane cloud fabric and the data plane cloud fabric. The Border Gateway Protocol (BGP) is a protocol used to exchange the routing information and the device addresses for the service plane. Forwarding (FWDING) is a feature that enables forwarding the data packets and Application Proxy (App proxy) is a feature that enables end-user(s) 122 to access on-premises web applications from a remote client.

The client devices 906 includes clientless Zero Trust Network Access (ZTNA) that uses a browser plug-in on the client device 906 to create a secure tunnel and perform the device authentication and application access.

The cloud native management plane 904 includes various components for cloud management including an authentication service for authenticating the request from the end-user(s) 122, a management service to manage the requests from multiple end-users 122, and an identity service for performing the identification of the end-users 122 and the end-user devices 195 making the requests. A telemetry service for recording and transmitting data from the end-user devices 195 to the monitoring and analysis system 910 for monitoring and analysis of the acquired data. An Application Programming Interface (API) service facilitates Representational state transfer (REST)/API/JavaScript object notation (JASON) interactions of the cloud native management plane 904 with the monitoring and analytics system 910. A Big Query component allows data analytics for the cloud native management plane 904. The monitoring and analytics system 910 includes DevOps for data testing, Application Programming Interface (API)/Workflow allows running workflows, and the monitoring and analytics unit performs data monitoring and analytics on the data exchanged with the gateway endpoints.

Configuration/telemetry is used by the gateway device 912 to communicate with the cloud native management plane 904. The gateway device 912 is an inline device connected to the end-user device 195 using the Internet and used to route the requests of the end-user device 195 to the service provider. The service provider may be the cloud provider 140. Based on the configuration of the gateway device 912, the end-user device 195 communicates to the cloud native management plane 904. The cloud native management plane 904 responds to the gateway device 195 and the request is processed to the control plane in the cloud native control and data plane 902. The control plane provides the routing information to the data plane for forwarding the data packets corresponding to the request to the service provider for processing the request. The service provider responds to the request by providing access to the data on a secure tunnel.

Figure 10:
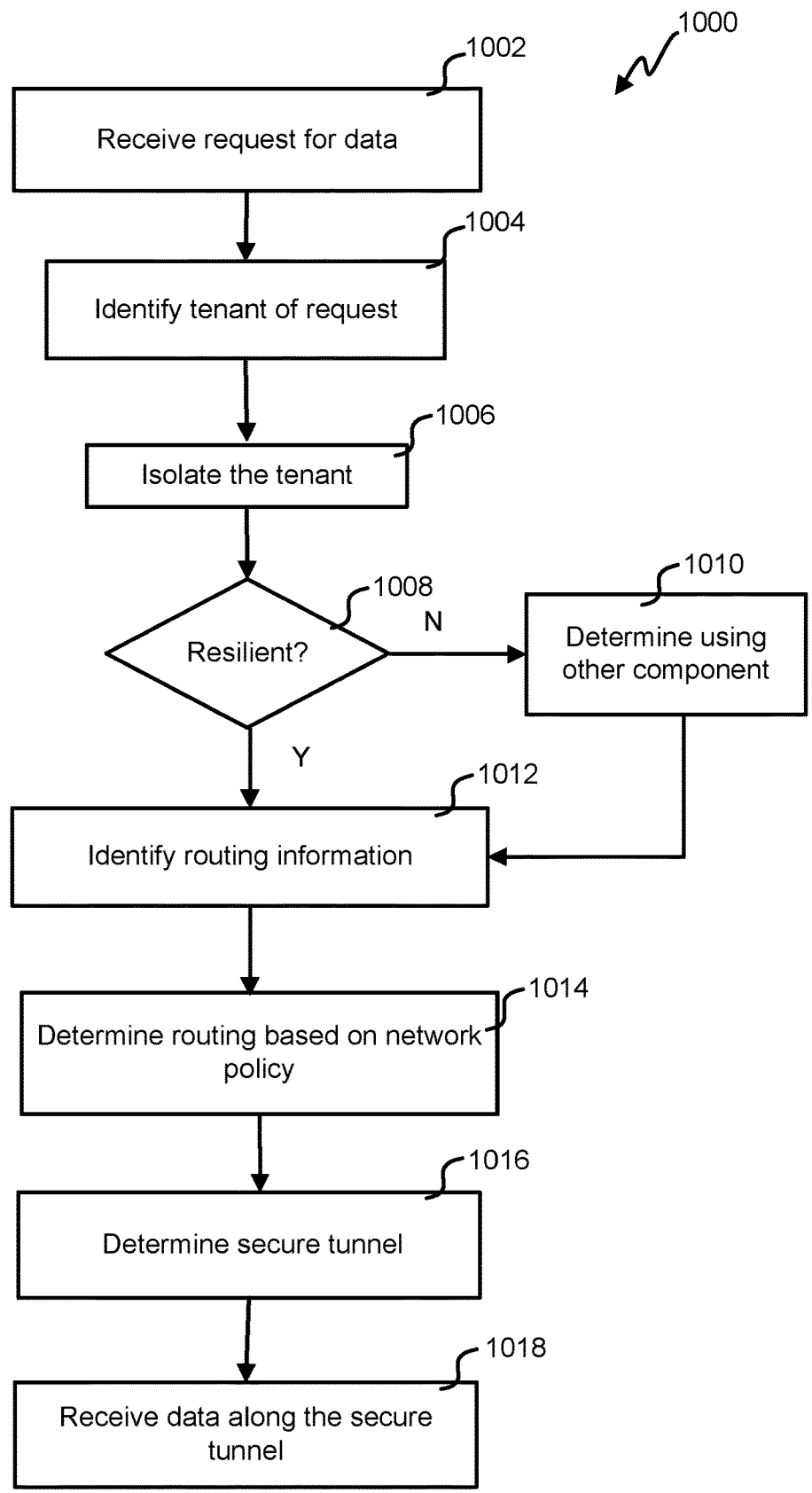
FIG. 10 illustrates a flowchart of an embodiment of a data exchange process for operating a multi-tenant cloud native control plane system that provides communication between a plurality of gateway endpoints and cloud services.

Referring next to FIG. 10, a flowchart of an embodiment of a data exchange process 1000 for operating a multi-tenant cloud native control plane system that provides communication between a plurality of gateway endpoints and cloud services is shown. The depicted portion of the process begins at block 1002 where the end-user(s) 122 of the end-user device 195 requests for access to a service or data from the cloud provider(s) 140. The request is received by the cloud control plane 102 from the client endpoint 406 of the end-user device 195 via the gateway device 104. The request is provided by sending data packets to the cloud control plane 102. The cloud control plane 102 provisions the connection to a service endpoint 214 at the cloud provider(s) 140 for providing the access to the data using a data plane and a control plane.

At block 1004, a tenant of the request is identified by the cloud control plane 102. The tenant is an enterprise 198 of the end-user(s) 122. At block 1006, the tenant is isolated from the other tenants in a network of the multi-tenant cloud native control plane system. Tenant identification and tenant isolation are important for processing the request because access to the data will depend on the tenancy associated with the end-user(s) 122.

At block 1008, resiliency of the network is identified based on whether the control plane or the data plane has failed to work. That is, the working condition of the control plane and the data plane is identified. During a bottleneck situation and network congestion, either the control plane or data plane might fail to work which results in connection failure. In order to maintain the network/network connection and meet the request of the end-user(s) 122, the failure of the control plane or the data plane is checked by the resiliency engine 604 of the cloud control plane 102. Since the components including the control plane and the data plane are separated and isolated from each other, the failure of one component does not affect the working of the other component. If the control plane fails then at block 1010, the data plane is used to maintain the network. Similarly, if the data plane fails then at block 1010, the control plane is used to maintain the network. If both the control plane and the data plane are working and have not failed, then at block 1012, routing information is identified to establish the network connection for the request.

The cloud control plane 102 identifies network patterns from the traffic coming from the end-user devices 122 of the tenants. The control plane had provided routing information corresponding to the traffic coming from the end-user device(s) 122 in the past. The network patterns include connections between the end-user device(s) 122, the gateway endpoints, user locations, and/or device addresses. The network patterns are used by the cloud control plane 102 to determine a network policy associated with access to the data.

At block 1014, the network policy specifies routing for access to the data, and the network policy is based on tenant specific rules, applications, user locations, network, preferences, and/or priorities. The network policies are stored in the policy store 610.

At block 1016, a secure tunnel from a number of tunnels is selected for providing access to the data based on the network policy. The secure tunnel is the best route or tunnel for access to the data. The secure tunnel is used by the cloud provider(s) 140 for providing the access to the data requested by the end-user(s) 122. The data plane forwards the data packets on the secure tunnel for providing access to the data using the routing information from the control plane.

At block 1018, the data is accessed by the end-user(s) 122 via the secure tunnel. The secure tunnel connects the client endpoint 406 and the service endpoint 214 for providing the data to the end-user(s) 122 on the end-user device 195. For example, the request for accessing a social media page is provided to the end-user(s) 122 for a specific time limit based on the network policies of the tenant of the end-user(s) 122.

Figure 11:
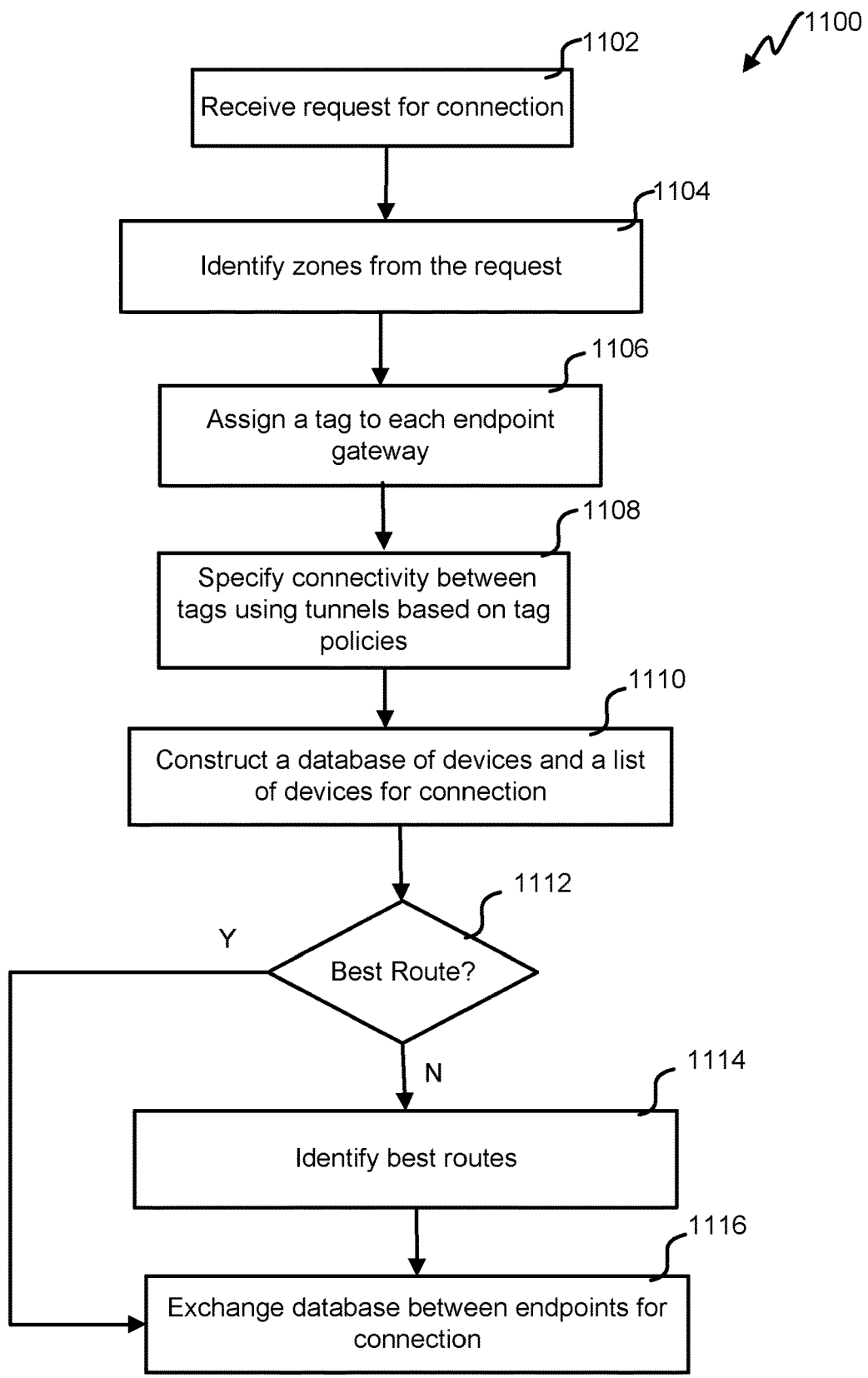
FIG. 11 illustrates a networking process for implementing a tag-based network configuration for a tenant in a network based on tags.

Referring next to FIG. 11, a flowchart of an embodiment of a networking process 1100 for implementing a tag-based network configuration for a tenant in a network based on tags is shown. The depicted portion of the process 1100 begins at block 1102 where a request for a network connection is received by the cloud control plane 102 from an end-user(s) 122 using the end-user device 195 in a cloud native control plane system 100. The network connection may be a VPN connection. The cloud control plane 102 provisions the network connection to the cloud provider(s) 140 by processing the request based on the tags. The request is initiated to the cloud provider(s) 140 for access to a service or data like browsing, applications, content etc. The connection is to be established between the client endpoint 406 of the client device 195 and the service endpoint 214 of the cloud provider(s) 140. A tenant associated with the request is identified and isolated from multiple tenants by the cloud control plane 102.

At block 1104, zones are identified based on the request. The zones include locations of the client endpoint 406 and location of the service endpoint 214 of the cloud provider(s) 140. The client endpoint 406 of the end-user device 195 makes the request and the service endpoint 214 of the cloud provider(s) 140 responds to the request.

At block 1106, a tag is assigned to each gateway endpoint in the network based on a tag policy. The tag policy is based on the zones, tenant specific rules, a user location, a network connection, and/or a priority associated with the gateway endpoints. The tag policy specifies connectivity between the tags. The tag policy is stored in the policy store 610. The tags associated with the request are determined for the connection.

At block 1108, connectivity of the tags between the endpoints is identified from the network traffic coming from the gateway endpoints of the end-user devices 195. Patterns from the connectivity of the tags are identified. The patterns include connections between the end-user devices 195, the gateway endpoints, user locations, and/or device addresses. A number of tunnels between the tags is specified based on the patterns and the connectivity of the tags.

At block 1110, a database of devices with corresponding device addresses is generated. The devices are associated with the corresponding gateway endpoints in the network and are used to establish network connections. The database of devices is exchanged between the gateway endpoints using a protocol to determine routes between the gateway endpoints. The routes specify tunnels between the gateway endpoints.

At block 1112, a secure tunnel from the number of tunnels is identified based on the tags of the gateway endpoints associated with the tenant. At block 1112, the identified secure tunnel is determined to be the best route for the network connection based on the tag policies. If the secure tunnel is not available, the next best route is identified at block 1114. The database of devices is exchanged again at block 1116 to find out the next best tunnel based on the priority set by the tag policies. For example, if a tunnel between green tags is not available, a tunnel between blue tags may be selected as the best route. In another example, the green tag may be preferred over the yellow tag or red tag. The process continues until the tunnel is available to meet the request. The network connection is established between the client endpoint 406 and the service endpoint 214 via the tunnel based on the tunnel being the best route for the network connection.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

We claim:

1. A multi-tenant cloud native control plane system for providing network connections between a plurality of gateway endpoints using prioritized tags and secure tunnels, the multi-tenant cloud native control plane system comprises: an end-user device including a client endpoint, the client endpoint is configured to provide a request for establishing a network connection between the client endpoint and a service endpoint of the plurality of gateway endpoints in a network; a cloud control plane coupled to the end-user device; and a cloud provider configured to provide data on the service endpoint corresponding to the request, wherein the cloud control plane is configured to: receive the request for establishing the network connection; identify a tenant associated with the request and isolate the tenant from a plurality of tenants; assign tags to each gateway endpoint in the network based on tag policies, wherein the tag policies are based on zones associated with the request, tenant specific rules, a user location, the network connection, or a priority associated with the plurality of gateway endpoints, and the tag policies specify connectivity between the tags; classify the tags into one or more categories based on the tag policies associated with the request; identify the connectivity of the tags of plurality of endpoints from network traffic of devices corresponding to the plurality of gateway endpoints; identify the tags corresponding to the tenant associated with the request; prioritize one or more tags for the network connection between the gateway endpoints based on the tag policies, wherein a prioritizing order for one or more categorized tags are set in order of a priority of tags; identify patterns from the connectivity of the tags, wherein the patterns include connections between the devices, the gateway endpoints, user locations or device addresses; specify a plurality of tunnels between the tags based on the patterns and the connectivity of the tags; generate a database of devices with corresponding device addresses, wherein the devices are associated with the corresponding gateway endpoints in the network; exchange the database of devices between the plurality of gateway endpoints using a protocol to determine routes between the plurality of gateway endpoints; determine a secure tunnel from the plurality of tunnels based on the tags corresponding to the tenant; and establish the network connection between the client endpoint and the service endpoint via the secure tunnel using the routes between the plurality of gateway endpoints.

2. The multi-tenant cloud native control plane system for providing network connections between a plurality of gateway endpoints using prioritized tags and secure tunnels as recited in claim 1, wherein the one or more categorized tags correspond to green tags, blue tags, red tags, yellow tags, and white tags.

3. The multi-tenant cloud native control plane system for providing network connections between a plurality of gateway endpoints using prioritized tags and secure tunnels as recited in claim 1, wherein the one or more categorized tags are prioritized by prioritizing one category of tags over other category of tags.

4. The multi-tenant cloud native control plane system for providing network connections between a plurality of gateway endpoints using prioritized tags and secure tunnels as recited in claim 1, wherein the tag policies and priority of tags are set by an administrator, end user or an enterprise using a configuration portal.

5. The multi-tenant cloud native control plane system for providing network connections between a plurality of gateway endpoints using prioritized tags and secure tunnels as recited in claim 1, wherein the network connection is a Virtual Private Network (VPN) connection.

6. The multi-tenant cloud native control plane system for providing network connections between a plurality of gateway endpoints using prioritized tags and secure tunnels as recited in claim 1, wherein the secure tunnel is determined by a tunnel selector based on the tags.

7. The multi-tenant cloud native control plane system for providing network connections between a plurality of gateway endpoints using prioritized tags and secure tunnels as recited in claim 1, wherein the request is received from an input processor by a tag controller for processing the request.

8. The multi-tenant cloud native control plane system for providing network connections between a plurality of gateway endpoints using prioritized tags and secure tunnels as recited in claim 1, wherein the tenant specific rules include restrictions on data access, connection, and network imposed by the tenant on end-users.

9. The multi-tenant cloud native control plane system for providing network connections between a plurality of gateway endpoints using prioritized tags and secure tunnels as recited in claim 1, wherein the request includes a tenant identifier used to identify the tenant of the request.

10. The multi-tenant cloud native control plane system for providing network connections between a plurality of gateway endpoints using prioritized tags and secure tunnels as recited in claim 1, wherein the protocol used to exchange the database of devices is a Border Gateway Protocol (BGP).

11. The multi-tenant cloud native control plane system for providing network connections between a plurality of gateway endpoints using prioritized tags and secure tunnels as recited in claim 1, wherein a tag controller assigns the tags to each gateway endpoint in a cloud native control plane system based on the tag policies.

12. A networking method for implementing a tag-based network configuration for a tenant in a network based on prioritized tags, the networking method comprising: receiving a request for establishing a network connection between a client endpoint and a service endpoint of a plurality of gateway endpoints in the network; identifying a tenant associated with the request and isolate the tenant from a plurality of tenants; assigning tags to each gateway endpoint in the network based on tag policies, wherein the tag policies are based on zones associated with the request, tenant specific rules, a user location, the network connection, or a priority associated with the plurality of gateway endpoints, and the tag policies specify connectivity between the tags; classifying the tags into one or more categories based on the tag policies associated with the request; identifying the connectivity of the tags of plurality of endpoints from network traffic of devices corresponding to the plurality of gateway endpoints; identifying the tags corresponding to the tenant associated with the request; prioritizing one or more tags for the network connection between the gateway endpoints based on the tag policies, wherein a prioritizing order for one or more categorized tags is set in order of a priority of tags; identifying patterns from the connectivity of the tags, wherein the patterns include connections between the devices, the gateway endpoints, user locations or device addresses; specifying a plurality of tunnels between the tags based on the patterns and the connectivity of the tags; generating a database of devices with corresponding device addresses, wherein the devices are associated with the corresponding gateway endpoints in the network; exchanging the database of devices between the plurality of gateway endpoints using a protocol to determine routes between the plurality of gateway endpoints; determining a secure tunnel from the plurality of tunnels based on the tags corresponding to the tenant; and establishing the network connection between the client endpoint and the service endpoint via the secure tunnel using the routes between the plurality of gateway endpoints.

13. The networking method for implementing a tag-based network configuration for a tenant in a network based on prioritized tags as recited in claim 12, wherein the one or more categorized tags correspond to green tags, blue tags, red tags, yellow tags, and white tags.

14. The networking method for implementing a tag-based network configuration for a tenant in a network based on prioritized tags as recited in claim 12, further comprising prioritizing the one or more categorized tags by prioritizing one category of tags over other category of tags.

15. The networking method for implementing a tag-based network configuration for a tenant in a network based on prioritized tags as recited in claim 12, wherein the tag policies and the priority of tags are set by an administrator, end user or an enterprise using a configuration portal.

16. The networking method for implementing a tag-based network configuration for a tenant in a network based on prioritized tags as recited in claim 12, wherein the network connection is a Virtual Private Network (VPN) connection.

17. The networking method for implementing a tag-based network configuration for a tenant in a network based on prioritized tags as recited in claim 12, wherein the secure tunnel is determined based on the tags.

18. The networking method for implementing a tag-based network configuration for a tenant in a network based on prioritized tags as recited in claim 12, wherein the protocol used to exchange the database of devices is a Border Gateway Protocol (BGP).

19. The networking method for implementing a tag-based network configuration for a tenant in a network based on prioritized tags as recited in claim 12, wherein the tenant specific rules include restrictions on data access, connection, and network imposed by the tenant on end-users.

20. A non-transitory computer-readable medium comprising computer-executable code, the computer-executable code configured for: receiving a request for establishing a network connection between a client endpoint and a service endpoint of a plurality of gateway endpoints in a network; identifying a tenant associated with the request and isolate the tenant from a plurality of tenants; assigning tags to each gateway endpoint in the network based on tag policies, wherein the tag policies are based on zones associated with the request, tenant specific rules, a user location, the network connection, or a priority associated with the plurality of gateway endpoints, and the tag policies specify connectivity between the tags; classifying the tags into one or more categories based on the tag policies associated with the request; identifying the connectivity of the tags of plurality of endpoints from network traffic of devices corresponding to the plurality of gateway endpoints; identifying the tags corresponding to the tenant associated with the request; prioritizing one or more tags for the network connection between the gateway endpoints based on the tag policies, wherein a prioritizing order for one or more categorized tags are set in order of a priority of tags; identifying patterns from the connectivity of the tags, wherein the patterns include connections between the devices, the gateway endpoints, user locations or device addresses; specifying a plurality of tunnels between the tags based on the patterns and the connectivity of the tags; generating a database of devices with corresponding device addresses, wherein the devices are associated with the corresponding gateway endpoints in the network; exchanging the database of devices between the plurality of gateway endpoints using a protocol to determine routes between the plurality of gateway endpoints; determining a secure tunnel from the plurality of tunnels based on the tags corresponding to the tenant; and establishing the network connection between the client endpoint and the service endpoint via the secure tunnel using the routes between the plurality of gateway endpoints.

* * * * *